_United States Patent Office_

3,192,200
Patented June 29, 1965

3,192,200
**1-CYCLOALKYL METHYL DERIVATIVES OF
1,4-BENZODIAZEPINE**
Heinz M. Wuest, Upper Montclair, N.J.
No Drawing. Filed Mar. 5, 1963, Ser. No. 262,846
2 Claims. (Cl. 260—239.3)

This invention relates to new and novel substituted 1,4-benzodiazepines of the formula:

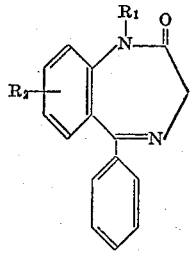

wherein $R_1$ represents a cycloalkylmethyl group such as cyclopropylmethyl, cyclobutylmethyl or cyclopentylmethyl and $R_2$ represents hydrogen, lower alkyl, lower alkoxy or halogen such as chlorine or bromine.

This invention also relates to a new and novel method for the production of the above compounds.

The novel compounds of this invention are useful as tranquilizers. For example, they exhibit anti-anxiety and sedative activity without undesirable side-effects such as hypnosis. The compounds alone or optionally, together with other active ingredients can be formulated with solid or liquid inert pharmaceutical carriers into dosage forms such as tablets, capsules, elixirs, suspensions or parenterals. As an ataraxic, for example, they are usually administered to humans afflicted with, for example, hyperirritability. In addition, they are useful as intermediates for the production of other substituted benzodiazepines.

In accordance with my invention, the new compounds described above are prepared by direct alkylation of compounds of the formula:

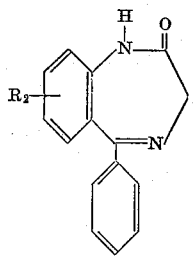

wherein $R_2$ is as defined above. Alkylating agents suitable for this reaction are, for example, cyclopropylmethyl bromide, cyclopropylmethyl β-naphthalene sulfonate and cyclopropylmethyl tosylate. This alkylation reaction proceeds best in an alkaline pH and is preferably effected by first treating the desired 1,4-benzodiazepine such as, for example, 7-chloro-5-phenyl-3H-1,4-benzodiazepine-2-one in an inert solvent with a strong base such as sodium hydride and, after the selected alkylating agent has been added, the entire mixture is refluxed for about 1 to 4 hours. The reaction product can be readily extracted from the reaction mixture by conventional extraction methods. Inert solvents which are suitable for the above reaction are for example dimethylformamide and toluene.

The alkylating agent and 1,4-benzodiazepine are conveniently employed in equimolar ratio.

Room temperature as mentioned hereinafter indicates a temperature of 20° to 25° C.

The following examples are included in order further to illustrate this invention.

PREPARATION OF 1-CYCLOPROPYLMETHYL-5-PHENYL - 7 - CHLORO-1H-1,4-BENZODIAZEPINE-2(3H)ONE

*Example 1*

(A) *By alkylation with cyclopropylmethyl bromide.*—To a solution of 5.63 g (0.020 mole) of 7-chloro-5-phenyl-3H-1,4-benzodiazepine-2-one in 70 ml. of toluene and 70 ml. of dimethylformamide is added 1.2 g. (0.027 mole) of a 53.2% dispersion of sodium hydride in mineral oil. The resulting solution is stirred two hours at room temperature and to it is added 3.0 g. (0.022 mole) of cyclopropylmethyl bromide, prepared according to J. S. Meek and J. W. Rowe, J. Am. Chem. Soc. 77, 6676 (1955). The resulting mixture after refluxing four hours is filtered and then extracted three times with 5% hydrochloric acid. The latter is washed with ether and is made basic with 10% sodium hydroxide and extracted three times into ether. The combined ethereal solution is dried and evaporated to an orange oil which when crystallized from 2 ml. of ethanol gives 1-cyclopropylmethyl-5-phenyl-7-chloro-1H-1,4-benzodiazepine-2(3H)one, M.P. 144°–145° C.

*Example 2*

(B) *By alkylation with cyclopropylmethyl β-naphthalenesulfonate.*—To a solution of 5.3 g. (0.018 mole) of 7-chloro-5-phenyl-3H-1,4-benzodiazepine-2-one in 65 ml. of toluene and 65 ml. of dimethylformamide is added 1.2 g. (0.027 mole) of a 53.2% dispersion of sodium hydride in mineral oil. The resulting solution is stirred for 2½ hours at room temperature and to it is added 5.4 g. (0.021 mole) of cyclopropylmethyl β-naphthalenesulfonate, prepared according to R. A. Sheen et al., J. Am. Chem. Soc. 83, 4847 (1961). The resulting solution is warmed, refluxed for one hour, cooled and filtered. The filtrate is concentrated to a glassy residue and is taken up in ether from which it spontaneously crystallizes giving 1-cyclopropylmethyl-5-phenyl-7-chloro-1H-1,4-benzodiazepine-2(3H)one M.P. 143°–145° C. which after recrystallization melts at 145°–145.5° C.

It is understood that the foregoing detailed description is given merely by way of illustration and that many variations may be made therein without departing from the spirit of my invention.

Having described my invention, what I desire to secure by Letters Patent is:

1. A compound of the formula:

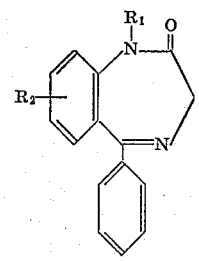

in which $R_1$ is a member selected from the group consisting of cyclopropylmethyl, cyclobutylmethyl and cyclopentylmethyl and $R_2$ is a member selected from the group consisting of hydrogen, halogen, lower alkyl and lower alkoxy.

2. 1-cyclopropylmethyl - 5 - phenyl - 7 - chloro-1H-1,4-benzodiazepine-2(3H)one.

References Cited by the Examiner
UNITED STATES PATENTS

| | | | |
|---|---|---|---|
| 2,576,106 | 11/51 | Cusic. | |
| 3,035,977 | 5/62 | Abood | 167—65 |
| 3,056,726 | 10/62 | Marsh | 167—65 |
| 3,109,843 | 11/63 | Reeder et al. | 260—239 |
| 3,121,076 | 2/64 | Keller et al. | 260—239.3 |
| 3,121,077 | 2/64 | Keller et al. | 260—239.3 |
| 3,136,815 | 6/64 | Reeder et al. | 260—239 |

OTHER REFERENCES

Rieser et al.: Organic Chemistry (New York, 1956), pages 295–296.

NICHOLAS S. RIZZO, *Primary Examiner.*